(No Model.)
G. R. BLOT.
ACCUMULATOR PLATE.
No. 535,885. Patented Mar. 19, 1895.
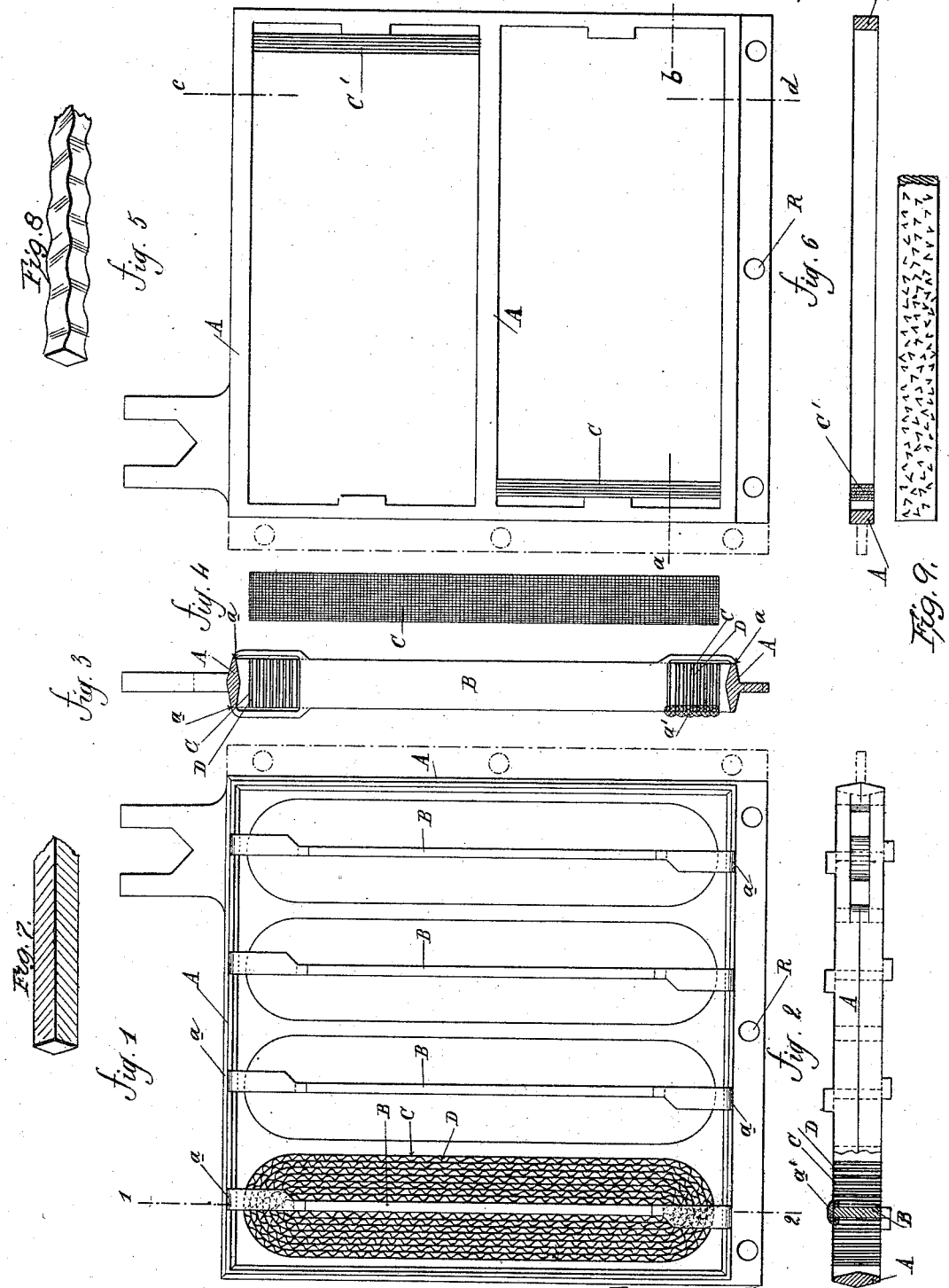
Witnesses:
C. B. Bolton
H. van Oldenneel
Inventor:
Georges René Blot
By Richards
his Attorneys.

UNITED STATES PATENT OFFICE.

GEORGES RENÉ BLOT, OF PARIS, FRANCE.

ACCUMULATOR-PLATE.

SPECIFICATION forming part of Letters Patent No. 535,885, dated March 19, 1895.

Application filed May 22, 1894. Serial No. 512,089. (No model.) Patented in France May 29, 1893, No. 230,422; in Belgium November 17, 1893, No. 107,189, and in England June 30, 1894, No. 10,169.

*To all whom it may concern:*

Be it known that I, GEORGES RENÉ BLOT, a citizen of the French Republic, residing at Paris, in the Department of the Seine, France, have invented certain new and useful Improvements in Accumulator-Plates, of which the following is a specification.

Patents have been granted in France May 29, 1893, No. 230,422; in Belgium on the 17th of November, 1893, No. 107,189, and in England June 30, 1894, No. 10,169.

My accumulator plate includes the combination of bands, thin plates, ribbons rolled or not, made of metal and provided with mechanically formed asperities and previously adapted for the accumulation by giving the same the maximum expansion they are susceptible of assuming so as to avoid the expansion or swelling which results from the transformation and the consequence of which is the rupture or dislocation of the frame that holds the plates.

In order to increase the active surface of my accumulator plates I arrange on a series of supporting strips formed of antimoniated lead, a series of said strips being secured to the frame by autogenous soldering. The ribbons I use are diamond shaped and striated by a laminating action in order to expose the greatest surface to the electrolyte and each two of the ribbons is separated by a third ribbon also diamond-shaped, but of corrugated or undulating form, the object of which is to allow the liquid to penetrate to all parts of the active material.

In the annexed drawings: Figure 1, is an elevation of an accumulator plate constructed in accordance with the principle of my invention; Fig. 2, a plan view partly in section of the same; Fig. 3, a vertical sectional view of the same on the line 1—2 of Fig. 1; Fig. 4, a view of one of the ribbons. Figs. 5, and 6 show respectively an elevation and a sectional view of a modification of a plate. Figs. 7, 8 and 9 represent in detail the ribbon or plates which are soldered to the frame A.

The same reference letters and figures refer to the same elements in the various views.

A represents the frame made of antimoniated lead to which are soldered, by autogenous soldering (a) a series of supporting strips B of the same material as the frame A is composed of and around which strips are wound blades or ribbons C D of pure lead previously formed up to the maximum expansion for serving as the active material. Those blades C are alternately diamond shaped or striated and the intermediate blades D are diamond shaped and undulated in order to allow the passing and the penetrating of the electrolyte to all parts of the strips. Each of the elements having been formed by winding the ribbon around the supports B, the said supports are soldered to the frame A in order to make up the plate. These solderings are made in an autogenous manner at the points (a) and in order to give more solidity to the different ribbons a thick layer of solder (a') is put upon the edges of the strips as in Fig. 2 and 3.

The accumulator plates thus formed work well, after the pure lead of the ribbons C—D is completely transformed, because the supports B that form the support penetrate to the center of the mass.

Of course the number of strips B and bands C—D used for forming a plate can vary at pleasure according to the desired dimensions of the plate and on the other hand the plates A can each be attached to one or more similar plates by means of rivets or the like passing through the openings R.

In order to allow the expansion or swelling of the lead, in the event of any defect or imperfections in the parts, it is well to leave some play in the different directions of the plate.

In the modifications shown in Figs. 5, 6, and 7 the supports B and ribbons C D are replaced by blades or thin plates c' made of lead and having asperities formed thereon mechanically. These thin plates are piled the one upon the other as shown in the drawings. One or more lines of said piling up having been made according to the dimension it is desired to give to the accumulator plate, they are placed in a mold at a proper distance apart and antimoniated lead is run into these spaces, which, by filling the same forms a rigid frame A to which the thin plates are soldered under the action of the melted metal. In this particular case I can use to advantage a system of coupling which consists in alternating successively, first, one thin plate or blade of pure lead, and, second, one smooth plate or blade of antimoniated lead or other metal or non-oxydizing alloy, which is not susceptible of being formed under the action of the current. The second arrangement presents the advantage that if, on account of a formation becoming too deep by use, the thin plates No. 1 have become completely transformed into non-conducting active matter, the intermediary thin plates or ribbons No. 2 which do not form under the action of the current would allow the continued service of the accumulator as they would bring the current into the heart of the active non-conducting matter. It is the same action as that which is obtained in the case of the bands and the supports B.

It is possible here to obtain plates of every required dimension by grouping together the elements in such a number as required by means of bolts or rivets which are introduced into the openings R.

In Fig. 1, the ribbons C D and in Fig. 5 the plates $c'$ constitute layers of material carried by the frame A and having interstices between them.

I claim—

1. In combination the frame A, the bands in the form of coils and the supporting means for said coils comprising the bars B with bifurcated ends said ends embracing the coiled bands and bearing against the sides of the frame A, said coils being transformed into active matter up to the greatest expansion, and connected through solder to the frame substantially as described.

2. An accumulator plate consisting of the frame, the supports B extending from side to side of the same and the series of bands or ribbons wound around the supports B, said bands being diamond shape, striated and undulated, substantially as described.

3. An accumulator plate consisting of the frame, the supports B, the bands or ribbons extending around the same, said bands being formed of pure lead and the frame and supporting strips of antimoniated lead secured by autogenous soldering, substantially as described.

In witness whereof I have hereunto set my hand in presence of two witnesses.

GEORGES RENÉ BLOT.

Witnesses:
CLYDE SHROPSHIRE,
JULES FAYOLLET.